US006892595B2

(12) United States Patent  (10) Patent No.: US 6,892,595 B2
Inoue et al.  (45) Date of Patent: May 17, 2005

(54) TRANSMISSION OF A WORKING VEHICLE

(76) Inventors: Toru Inoue, 2-18-1, Inadera, Amagasaki-shi, Hyogo (JP); Toshiyuki Hasegawa, 2-18-1, Inadera, Amagasaki-shi, Hyogo (JP)

( * ) Notice: Subject to any disclaimer, the term of this patent is extended or adjusted under 35 U.S.C. 154(b) by 25 days.

(21) Appl. No.: 10/321,592

(22) Filed: Dec. 18, 2002

(65) Prior Publication Data

US 2003/0114263 A1 Jun. 19, 2003

(30) Foreign Application Priority Data

Dec. 19, 2001 (JP) ......................................... 2001-386634

(51) Int. Cl.[7] ............................................. F16H 59/00
(52) U.S. Cl. ................................. 74/336 B; 74/360
(58) Field of Search ........................ 475/210, 211; 74/333, 336 B, 360

(56) References Cited

U.S. PATENT DOCUMENTS

| 3,309,934 | A | * | 3/1967 | Gustafsson et al. ............ 74/339 |
| 4,660,438 | A | * | 4/1987 | Tatara et al. ........... 74/336 B X |
| 4,706,770 | A | | 11/1987 | Simon |
| 4,876,920 | A | * | 10/1989 | Eichenberger ................ 475/66 |
| 5,913,950 | A | * | 6/1999 | Matsufuji ................... 74/730.1 |
| 6,543,596 | B2 | * | 4/2003 | Martin et al. ............ 192/85 AA |
| 2001/0023587 | A1 | | 9/2001 | Matsufuji |

FOREIGN PATENT DOCUMENTS

JP          358028046       *   2/1983   ............... 74/336 B

OTHER PUBLICATIONS

Copy of European Patent Office Search Report for Appl. No. EP 02 02 8522, dated Apr. 17, 2003, 3 pages.

* cited by examiner

*Primary Examiner*—Ha Ho
(74) *Attorney, Agent, or Firm*—Sterne, Kessler, Goldstein & Fox P.L.L.C.

(57) ABSTRACT

A compact transmission includes a reliable wet brake, which is disposed in a brake chamber formed on an outer surface of a sidewall of a housing of the transmission. Engine power is transmitted through a continuously variable transmission to an input shaft of the transmission. An intermediate shaft is drivingly connected to the input shaft through a reversing mechanism for changing the traveling direction of the vehicle. An axle is drivingly connected to the intermediate shaft through a deceleration gear train. The intermediate shaft is provided thereon with the reversing mechanism and a pinion of the deceleration gear train, and projects through the brake chamber so as to be provided thereon with the wet brake. Fluid in the housing is splashed by a gear of the deceleration gear train so as to flow into the brake chamber, and is returned into the housing.

10 Claims, 11 Drawing Sheets

TRANSMISSION OF A WORKING VEHICLE

BACKGROUND OF THE INVENTION

1. Field of the Invention

The present invention relates to a transmission structure of a working vehicle.

2. Background Art

As disclosed in U.S. Pat. No. 4,706,770, (hereinafter, "the '770 patent") there is a well-known transmission of a working vehicle, which comprises an input shaft for inputting engine power through a continuously variable transmission (hereinafter, "CVT"), an intermediate shaft drivingly connected to the input shaft through a reversing mechanism, and an axle or axles drivingly connected to the intermediate shaft through a deceleration gear train.

As shown in FIG. 4 of the '770 patent, an intermediate shaft 100 is disposed parallel to an input shaft 98, one end thereof projecting from a transmission housing 92. For braking the vehicle, a single-plate dry disk brake 148 provided on the projecting portion of intermediate shaft 100 brakes intermediate shaft 100, thereby braking wheels 16 and 20 via axles 36, 38, 40 and 42. A gear 116 for forward traveling and a sprocket 120 for backward traveling are disposed on intermediate shaft 100. Between gear 116 and sprocket 120 is disposed a small pinion 154, which meshes with a deceleration gear 156 on a differential gear unit 157 so as to constitute the deceleration gear train. This braking structure is advantageous in that both right and left axles 36 and 38 are braked by braking only intermediate shaft 100.

However, the conventional braking structure of the '770 patent lacks durability and reliability because dry brake 148 is likely to be burnt. Converting brake 148 into a wet brake might be considered to be an easy proposition, as brake 148 is disposed in transmission housing 92 which serves as an oil sump. However, intermediate shaft 100 is desired to be disposed above axles 36 and 38 so as to ensure sufficient clearance of the vehicle. To supply sufficient oil to the brake provided on intermediate shaft 100 above axles 36 and 38, a large quantity of oil must be filled in housing 92, thereby submerging intermediate shaft 100. This submersion is undesirable as gear 116, sprocket 120 and the like stir the oil in the housing, thereby causing power loss, increase of the weight of the transmission, etc.

BRIEF SUMMARY OF THE INVENTION

An object of the present invention is to provide a compact transmission whose housing is filled with oil so as to serve as an oil sump and includes an input shaft which inputs engine power through a CVT, an intermediate shaft drivingly connected to the input shaft through a reversing mechanism, and an axle drivingly connected to the intermediate shaft through a deceleration gear train, wherein the transmission is provided with a wet brake for braking the axle while power loss caused by gears stirring the oil in the housing is reduced.

To achieve the object, according to the present invention, disposed on the intermediate shaft are the reversing mechanism at one axial end side and a pinion of the deceleration gear train at the other axial end side. A brake chamber is formed on an outer surface of the sidewall of the housing opposite to the pinion with respect to the sidewall. The wet brake is provided on one end of the intermediate shaft which penetrates the sidewall of the housing and extends into the brake chamber. Oil in the housing is splashed by the deceleration gear so as to flow into the brake chamber through the sidewall of the housing and return into the housing.

Due to the structure, the transmission is provided with the wet brake which is advantageous in durability and reliability. The oil in the housing is effectively utilized for lubricating and cooling the brake so as to improve the stability of the actuation of the brake.

Additionally, the reversing mechanism, the pinion and the wet brake are compactly aligned on the intermediate shaft so as to minimize the transmission.

Even when the intermediate shaft is disposed above the axle, the brake chamber including the brake on the intermediate shaft is supplied with oil splashed by the deceleration gear. Therefore, the oil level need not be so high as to submerge the whole of the intermediate shaft with the wet brake, thereby saving lube in the housing and effectively restricting power loss caused by the stirring of oil by the gears and the like in the housing.

If the housing is formed with a pair of axle support portions projecting laterally from respective right and left sides of the housing so as to support the axle, the brake chamber may be disposed above one of the axle support portions. Thus, the transmission is made more compact, as the dead space above the axle support portion is utilized for arrangement of the brake.

Further, if the CVT is disposed at either the right or left side of the housing, i.e., if the input shaft for inputting engine power through the CVT projects from either the right or left side of the housing, the brake chamber may be disposed laterally opposite to the CVT with respect to the housing. Thus, the brake chamber and the CVT are distributed laterally with respect to the transmission housing so as not to hit against each other.

Additionally, on an inner surface of the sidewall of the housing, along an outer periphery of the deceleration gear, may be disposed a guide member for guiding the splashed oil, having a terminal end substantially above the intermediate shaft. Since the guide member facilitates sufficient flow of the splashed oil into the brake chamber, the oil circulation between the brake chamber and the oil sump of the housing is further promoted so as to restrain temperature rise.

Further, a pair of right and left axles differentially connected to each other through a differential gear unit may serve as the axle. The differential function of the differential gear unit may be canceled so as to connect the right and left axles integrally in connection with operation of the wet brake just prior to when the brake begins to act. Accordingly, even if the vehicle travels on a rough road so that the right and left axles receive different loads, it is possible for the vehicle to maintain straight travel and then stop. In particular, the vehicle is prevented from unexpectedly turning on braking.

Additionally, the differential function of the differential gear unit may be canceled in connection with operation of the wet brake immediately after the brake begins to act. Accordingly, while the fully braked vehicle is prevented from unexpectedly turning, the vehicle is allowed optionally to turn smoothly when being braked softly. As a further effect, in comparison with a differential gear unit which cancels its differential function just before the beginning of brake actuation, the frequency of operation for canceling the differential function of the differential gear unit of the present invention can be reduced so as to reduce load on the differential gear unit and prolong the life thereof.

These, other and further objects, features and advantages will appear more fully from the following description.

BRIEF DESCRIPTION OF THE DRAWINGS/FIGURES

DETAILED DESCRIPTION OF THE INVENTION

Figure 1:
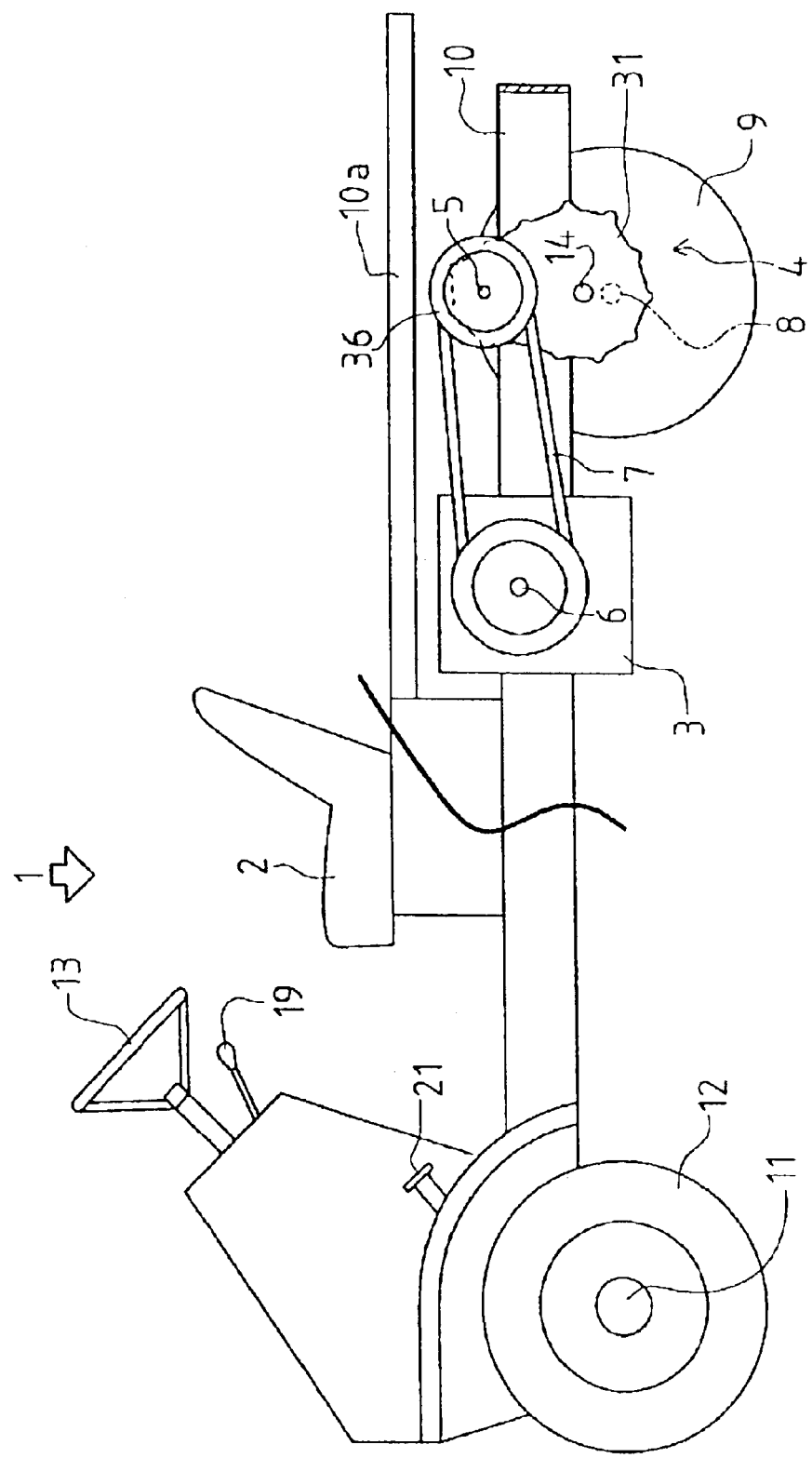
FIG. 1 is a side view of a working vehicle equipped with a transmission according to a first embodiment of the present invention.

Description will be given of a general structure of a working vehicle 1 according to the present invention, as shown in FIG. 1.

Working vehicle 1 comprises a chassis 10 on which a driver's seat 2 and an engine 3 disposed behind seat 2 are mounted. A pair of right and left side plates are juxtaposed in parallel and joined to each other at their rear ends, thereby forming working vehicle 1 into a U-like shape when viewed in plan. A housing 31 of a transmission 4 is fixedly sandwiched between the right and left side plates of chassis 10. A bed frame 10a for mounting a bed thereon is supported on chassis 10 above engine 3 and transmission 4.

An input shaft 5 projects laterally from one of the right and left side surfaces (in this embodiment, left) of transmission 4. A belt type continuously variable transmission, i.e., a CVT 7, is interposed between input shaft 5 and a crankshaft 6 of engine 3. A pair of right and left differential yoke shafts 14 serving as first axles are extended laterally from both right and left sides of transmission 4. A rear wheel axle 8 serving as a second axle is connected to an outer end of each yoke shaft 14 through universal joints and a propeller shaft 15 (see FIG. 2). A rear drive wheel 9 is fixed onto an outer end of each rear wheel axle 8.

In a front portion of vehicle 1 is supported a front axle casing (not shown), in which a pair of right and left front axles 11 and a differential gear unit (not shown) differentially connecting front axles 11 are disposed. Front wheels 12 are attached onto outer ends of respective front axles 11 so that front wheels 12 are steerable according to manipulation of a steering wheel 13.

A front column is erected in front of seat 2. Steering wheel 13 is disposed on an upper portion of the front column, and a reversing lever 19 for switching the traveling direction of the vehicle between forward and backward is disposed beside steering wheel 13. An accelerator pedal 21 is disposed at the foot of the front column. Accelerator pedal 21 is operatively connected to a throttle valve (not shown) for adjusting the quantity of fuel injected into engine 3. According to the amount of depression of accelerator pedal 21, the open degree of the throttle valve is changed so as to adjust the level fuel injection, thereby changing the rotary speed of crankshaft 6 of engine 3.

Figure 2:
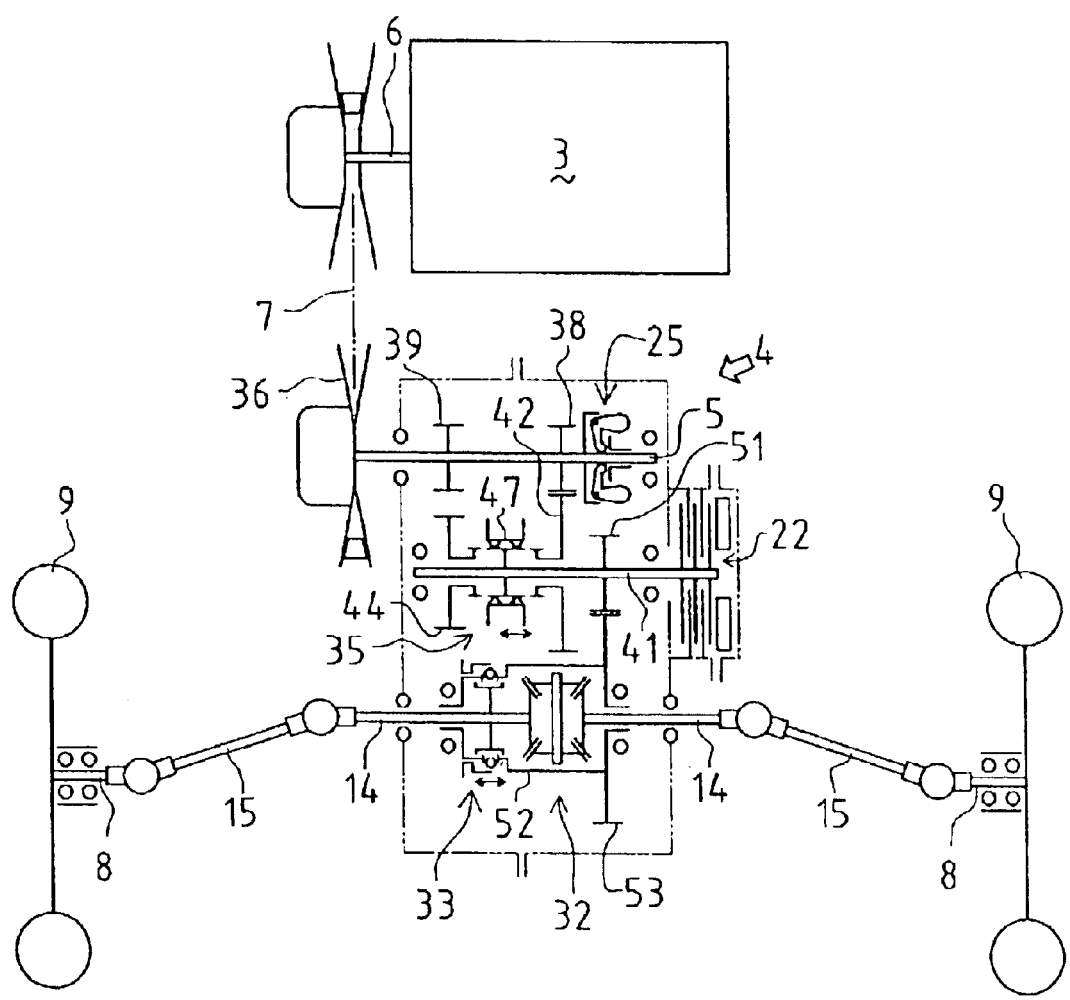
FIG. 2 is a diagram of a power transmission system of the working vehicle.

As shown in FIG. 2, the power of engine 3 is inputted to a transmission system in transmission housing 31 through crankshaft 6 and CVT 7. Further, the engine power is transmitted to rear wheels 9 together with rear wheel axles 8 from the transmission system through differential yoke shafts 14 and propeller shafts 15, thereby driving vehicle 1.

Description will now be given of an interior construction of transmission 4 provided on vehicle 1, in accordance with FIGS. 2 to 10.

Figure 3:
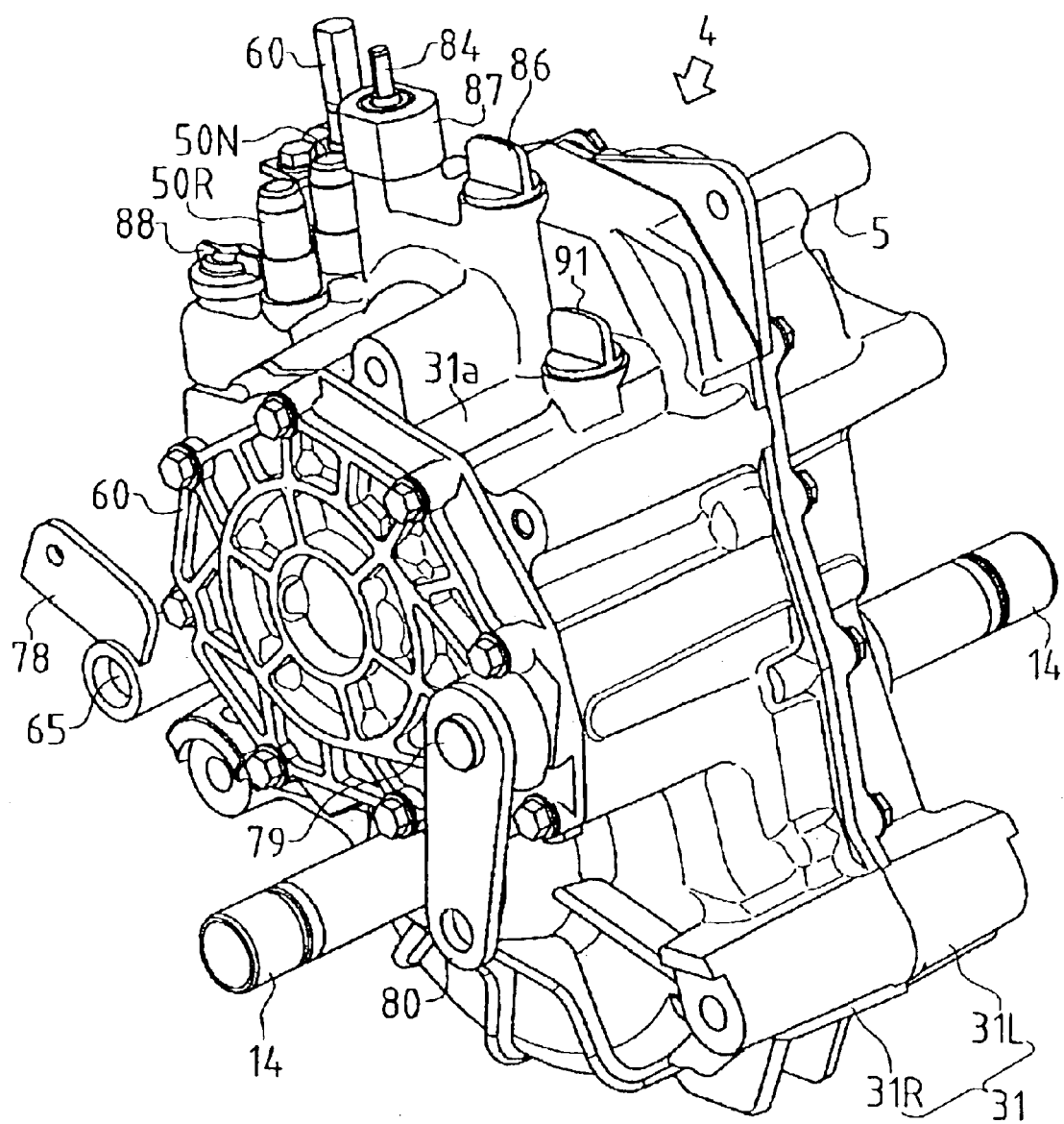
FIG. 3 is a perspective front view of the transmission.

As shown in FIGS. 2 and 3, a left half housing part 31L and right half housing part 31R are joined to each other through their vertical surrounding joint planes so as to constitute transmission housing 31, in which right and left differential yoke shafts (first axles) 14, a differential gear unit 32 differentially connecting yoke shafts 14 to each other, a differential locking mechanism 33, and a reversing mechanism 35 are disposed.

Figure 8:
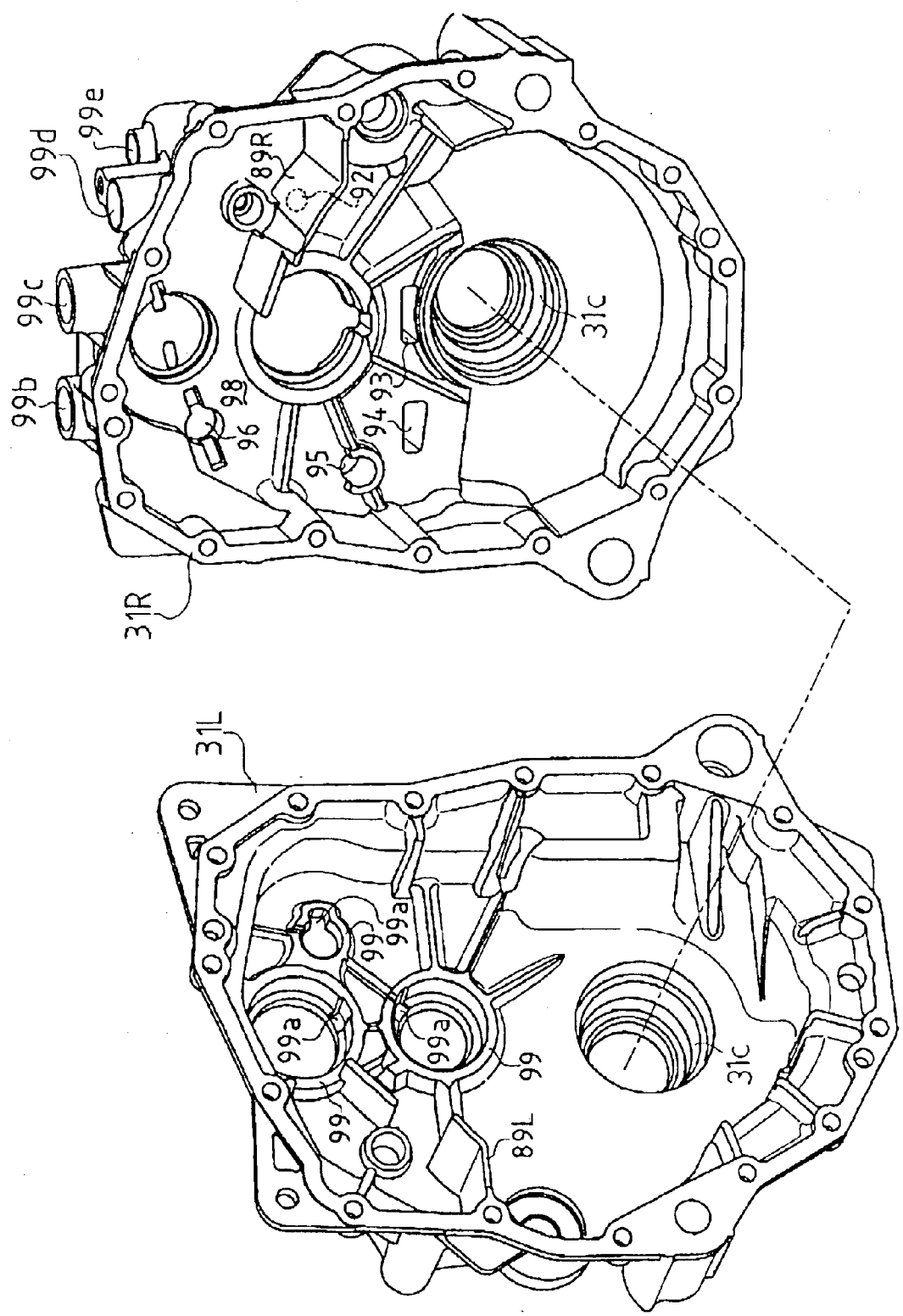
FIG. 8 is a perspective view of a divisional transmission housing part.

As shown in FIG. 8, both half housing parts 31L and 31R are formed with respective cylindrical axle support portions 31c projecting laterally outward from sidewalls of respective half housing parts 31L and 31R. Yoke shafts 14 serving as the first axles are rotatably supported by respective right and left axle support portions 31c of housing 31. Proximal ends of yoke shafts 14 project inward from axle support portions 31c so as to be differentially connected to each other through differential gear unit 32. Distal ends of yoke shafts 14 serve as the second axles by projecting outward from axle support portions 31c so as to be drivingly connected to rear wheel axles 8.

Differential locking mechanism 33 is operatively connected to a later-discussed differential locking lever 27 (see FIG. 11) disposed beside seat 2 so as to lock differential gear unit 32, i.e., to cancel the differential function of differential gear unit 32. Reversing mechanism 35 is operatively connected to reversing lever 19 so as to switch the traveling direction of the vehicle between forward and backward.

As shown in FIGS. 1 and 2, a split pulley serving as a driven pulley 36 is provided on an end portion of input shaft 5 projecting outside transmission housing 31. As usual, CVT 7 including pulley 36 and belt 7 automatically reduces its deceleration ratio continuously according to the increase of rotary speed of engine 3. Since it is enough that input shaft 5 is automatically continuously controlled in its rotary speed, the belt-type CVT 7 may be replaced with a hydrostatic transmission including hydraulic pump and motor.

Figure 4:
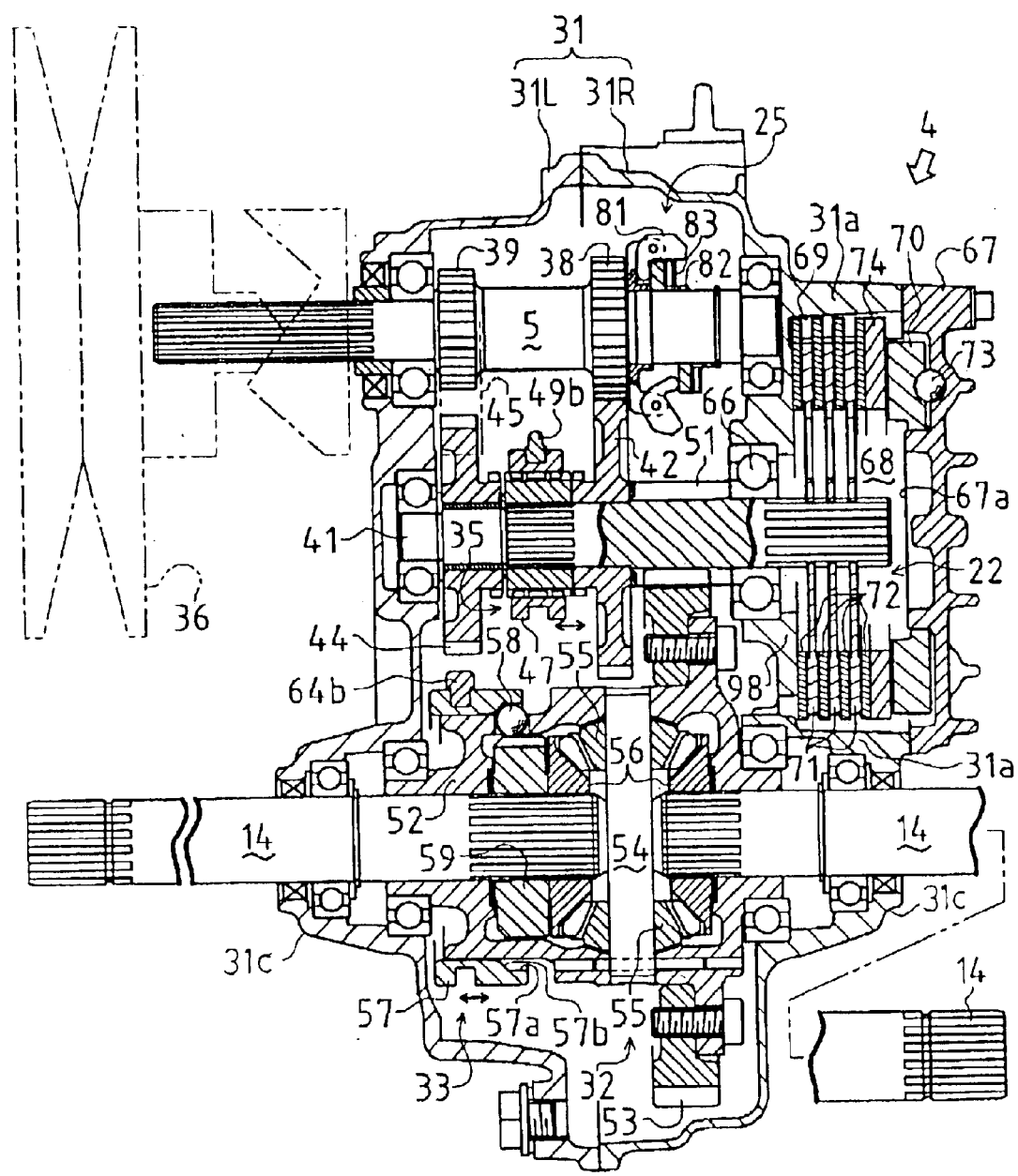
FIG. 4 is a sectional rear view of an internal structure of the transmission.
Figure 5:
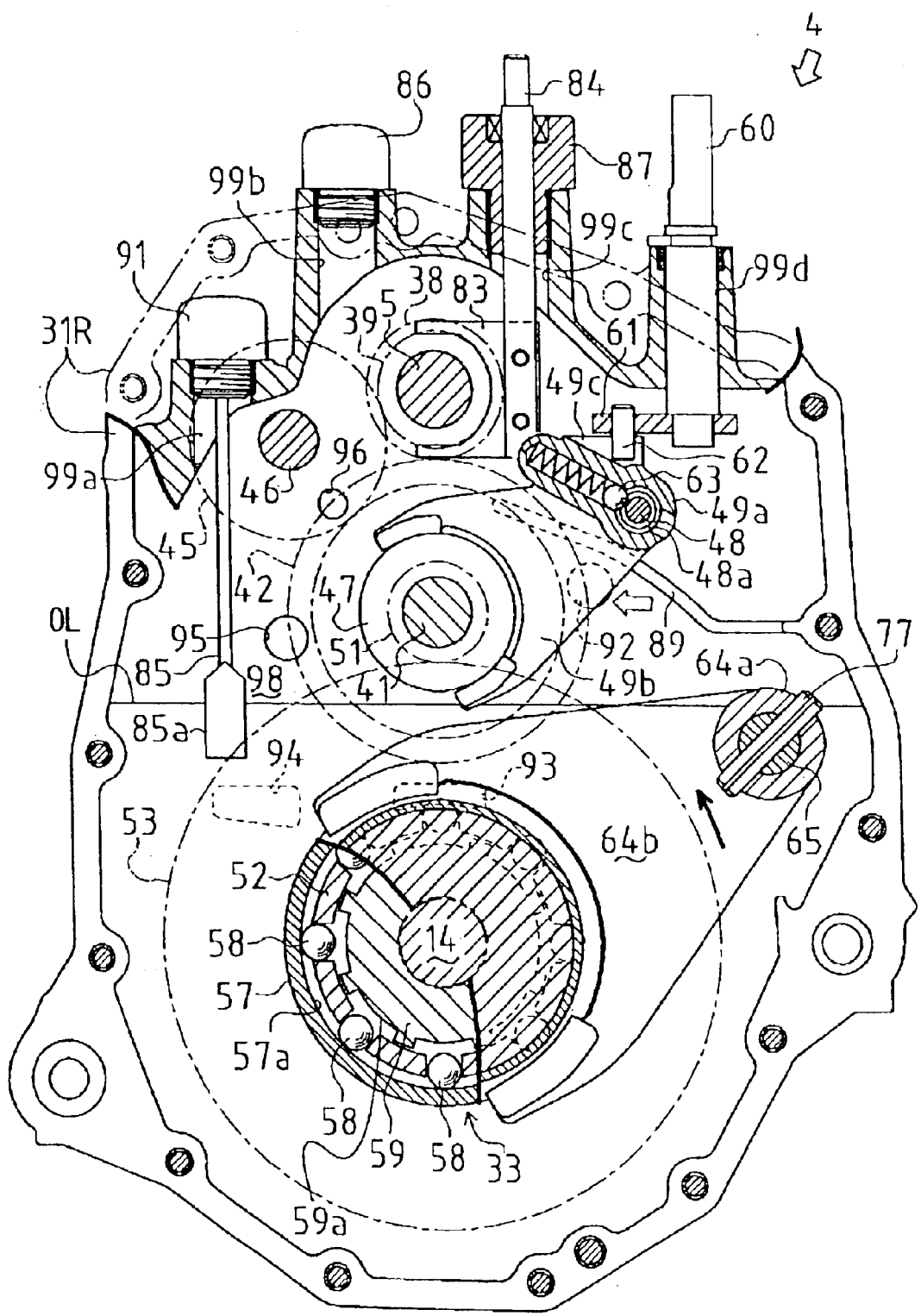
FIG. 5 is a sectional side view of the same.

As shown in FIG. 4, a centrifugal governor 25 is disposed on input shaft 5 so as to face a later-discussed output gear 51. Governor 25 comprises a governor weight 81, a lifter 82, a governor fork 83, and a governor shaft 84. As shown in FIG. 4, governor weight 81 is attached onto input shaft 5 so as to be actuated by a centrifugal force generated by rotating input shaft 5, thereby serving as a sensor detecting the rotary speed of input shaft 5. Lifter 82 is axially moved by the actuation of governor weight 81. As shown in FIG. 5, governor fork 83 is interlockingly connected to lifter 82 and fixed to governor shaft 84, which is rotatably supported by a ceiling of transmission housing 31.

An output shaft (not shown) is fixed onto an upper portion of governor shaft 84 projecting upward from transmission housing 31 so as to be operatively connected to the throttle valve (not shown) of engine 3 through an optimal linkage. Due to the construction, centrifugal governor 25 regulates the amount of fuel injected to engine 3 based on detection of the rotary speed of input shaft 5, thereby changing the output of engine 3 according to variation of rotary speed of input shaft 5.

Figure 6:
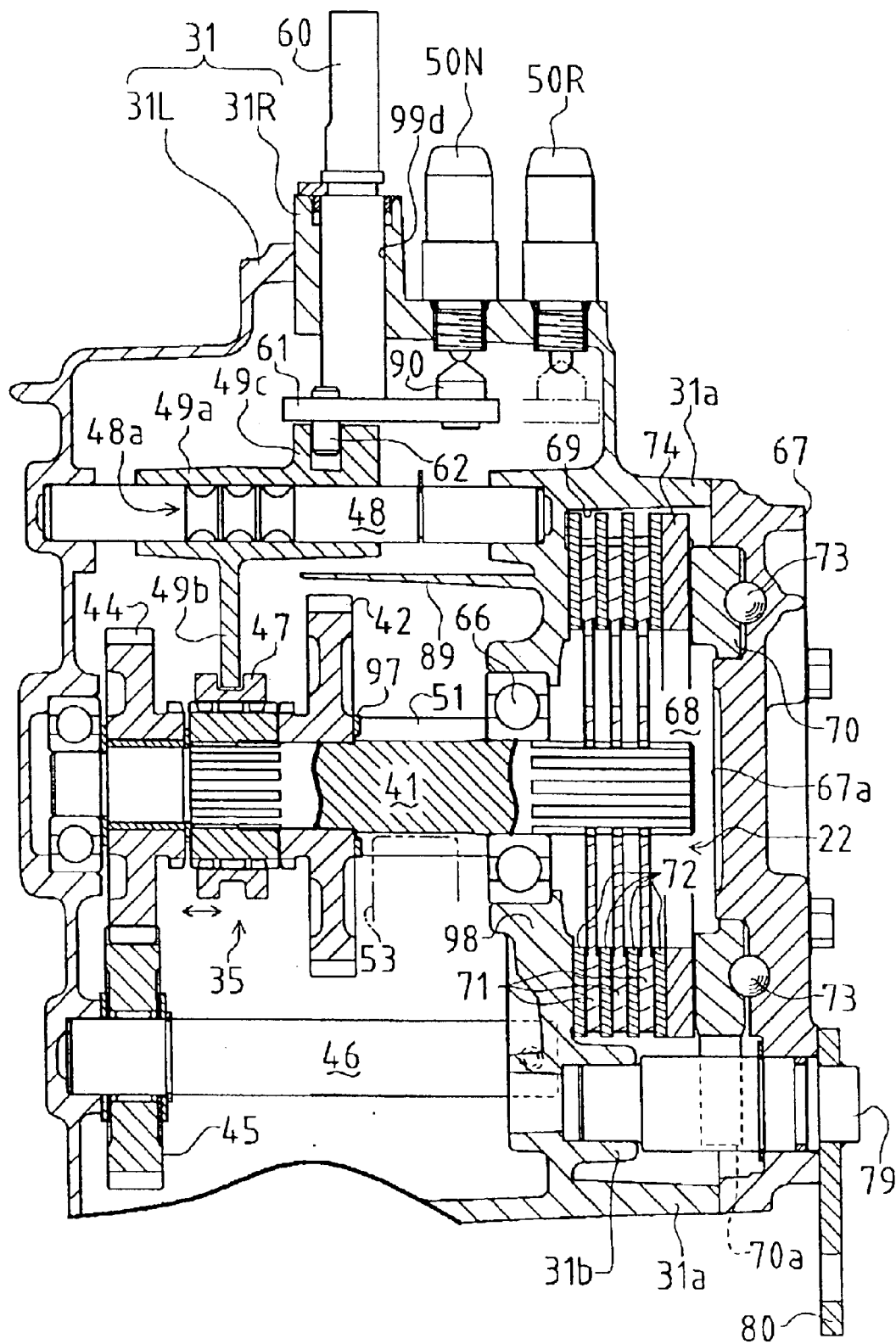
FIG. 6 is a developed sectional view of an operation system for a reversing mechanism.

Referring to reversing mechanism 35, as shown in FIG. 2, input shaft 5 is notched on the peripheral surface thereof so as to integrally form a forward-traveling drive gear 38 and a backward-traveling drive gear 39 integrally. An intermediate shaft 41 is disposed parallel to input shaft 5. A forward-traveling driven gear 42 and a backward-traveling driven gear 44 are relatively rotatably disposed on intermediate shaft 41. Forward-traveling driven gear 42 meshes with forward-traveling drive gear 38. As shown in FIGS. 5 and 6, a reversing gear 45 is relatively rotatably supported on a support shaft 46 laid in transmission housing 31. Backward-traveling driven gear 44 engages with backward-traveling drive gear 39 on input shaft 5 through reversing gear 45.

As shown in FIG. 4, a clutch slider 47 is axially slidably and not relatively rotatably disposed on intermediate shaft 41 between forward-traveling driven gear 42 and backward-traveling driven gear 44. Clutch slider 47 is slid along intermediate shaft 41 so as to selectively mesh with one of driven gears 42 and 44, thereby applying either regular or reverse rotational force onto intermediate shaft 41. Further, clutch slider 47 can be disposed at a neutral position so as to mesh with neither gear 42 nor 44. The reversing mechanism 35 of such a structure interlocks input shaft 5 with intermediate shaft 41.

Clutch slider 47 is formed on its outer peripheral surface with an annular groove into which a fork portion 49b of a clutch shift member 49 is inserted. As shown in FIG. 6, clutch shift member 49 consists of a cylindrical base portion 49a, fork portion 49b integrally extended from base portion 49a, and an expanded portion 49c integrally expanded from base portion 49a. Base portion 49a is slidably fitted on a support shaft 48 disposed parallel to intermediate shaft 41.

A vertically axial opening 99d is formed in the ceiling of transmission housing 31. A shift control shaft 60 is rotatably fitted through opening 99d. A wide arm 61 is fixed onto a lower end of shift control shaft 60 under opening 99d, and a pin 62 projecting from a bottom surface of arm 61 is fitted into a groove formed in expanded portion 49c of clutch shift member 49. An upper portion of shift control shaft 60 projecting upward from transmission housing 31 is fixedly provided thereon with a shift lever (not shown) operatively connected to reversing lever 19 (see FIG. 1) through an optimal linkage.

By tilting reversing lever 19, shift control shaft 60 is rotated through the shift lever so that pin 63 on rotating arm 61 slides clutch shift member 49 axially on support shaft 48 thereby selectively locating clutch slider 47, which is connected to fork portion 49b of clutch shift member 49, among its forward-traveling position, backward-traveling position and neutral position.

As shown in FIG. 6, on a portion of support shaft 48 fitting the inner peripheral surface of base portion 49a of clutch shift member 49 are formed three annular grooves 48a. As shown in FIG. 5, a detent ball 63, disposed in base portion 49a and biased by a spring, is allowed to selectively fit into one of grooves 48a. Thus, a detent mechanism is constructed so as to define three positions of reversing mechanism 35, i.e., the forward-traveling position, the backward-traveling position and the neutral position.

From an upper surface of arm 61 projects a push member 90. Two electric switches, i.e., a neutral detection switch 50N and a backward-traveling detection switch 50R are mounted on the ceiling of transmission housing 31 so that their contact makers project downward in transmission housing 31. Switches 50N and 50R are so located that, when clutch slider 47 is located at the neutral position, push member 90 lifts the contact maker of switch 50N, and when clutch slider 47 is at the backward-traveling position, push member 90 lifts the contact maker of switch 50R.

Both switches 50N and 50R are electrically connected to a controller (not shown) which detects the conditions of switches 50N and 50R, thereby determining where clutch slider 47 is located among the three possible positions. In detail, when switch 50N detects push member 90, the controller determines that reversing mechanism 35 is neutral. When switch 50R detects push member 90, reversing mechanism 35 is decided to be at the backward-traveling stage. When neither switch 50R nor 50R detects push member 90, the controller determines that reversing mechanism 35 is at the forward-traveling stage. Only two switches 50N and 50R are necessary to detect the three stages of reversing mechanism 35, thereby simplifying the structure for detecting the stage of reversing mechanism 35.

The controller may be, for example, connected to an electric circuit for driving self-starter (not shown) of engine 3. In this case, unless reversing lever 19 is located at its neutral position, the controller prevents the self-starter from driving so as to prevent engine 3 from starting.

Referring to differential gear unit 32, as shown in FIG. 2, intermediate shaft 41 is provided on one axial end thereof with reversing mechanism 35 and notched on the other axial end thereof so as to form output gear 51, which meshes with a later-discussed ring gear 53 of differential gear unit 32, thereby transmitting the rotation of intermediate shaft 41 to differential gear unit 32.

Differential gear unit 32 is constructed in the typical fashion. That is, a differential casing 52 is supported in transmission housing 31 so as to share a rotary axis with differential yoke shafts 14. Ring gear 53 is affixed on differential casing 52 and meshes with output gear 51 of intermediate shaft 41. A pinion shaft 54 is disposed perpendicularly to yoke shafts 14 and rotatably provided on both ends thereof with respective pinions 55. A differential side gear 56 is disposed on a proximal end of each yoke shaft 14 and meshes with both pinions 55.

Ring gear 53 and output gear 51 on intermediate shaft 41 constitute a deceleration gear train for drivingly connecting intermediate shaft 41 to rear wheel axles 8. Output gear 51 serves as a small pinion, and ring gear 53 serves as a deceleration gear. Since pinions 55 are supported by pinion shaft 54 disposed in differential casing 52 to which ring gear 53 is fixed, it may be said that ring gear 53 supports pinions 55 through differential casing 52 and pinion shaft 54.

Referring to differential locking mechanism 33, as shown in FIG. 4, both axial ends of differential casing 52 are formed into respective cylindrical portions, whose outer peripheral surfaces are fitted to transmission housing 31 through respective bearings, and whose inner peripheral surfaces are relatively rotatably fitted to respective yoke shafts 14. Differential casing 52 is fastened on one axial end thereof to ring gear 53 with bolts, and provided on the other end thereof with differential locking mechanism 33 for locking differential gear unit 32.

Differential locking mechanism 33 comprises a ring-like shaped differential locking slider 57 and steel balls 58. Differential locking slider 57 is axially slidably fitted onto the outer peripheral surface of differential casing 52. Differential casing 52 is radially bored through with holes in regular intervals. Steel balls 58 are fitted in the respective holes of differential casing 52 so that each steel ball 58 has a small amount of play in the hole. An engaging member 59 is formed on an outer peripheral surface of differential casing 52 with a groove 59a into which steel balls 58 fit. Engaging member 59 has an axial hole into which one of yoke shafts 14 is not-relatively rotatably inserted. Differential locking slider 57 is formed at one axial end on an inner peripheral surface thereof with an annular recess 57a, which has a gently slanted surface 57b.

When differential locking slider 57 is located at a "differential position" as show in FIG. 2 and the vehicle 1 drives, the centrifugal force generated from rotating differential casing 52 causes a part of each steel ball 58 to be inserted into recess 57a of differential locking slider 57 and releases steel balls 58 from groove 59a of engaging member 59, as shown in FIGS. 4 and 5, thereby allowing yoke shafts 14 to be rotatable relative to differential casing 52. Thus, differential gear unit 32 is put in a "differential mode" where right and left rear wheel axles 8 are allowed to rotate differentially.

Alternatively, when differential locking slider 57 is located at a "differential locking position" adjacent to ring gear 53, slanted surface 57b of differential locking slider 57 presses steel balls 58 so as to insert a part of each steel ball 58 into groove 59a of engaging member 59, thereby fixing differential casing 52 to yoke shafts 14. Accordingly, differential gear unit 32 is put in a "differential locking mode" where right and left rear wheel axles 8 are rotated integrally with each other.

Figure 7:
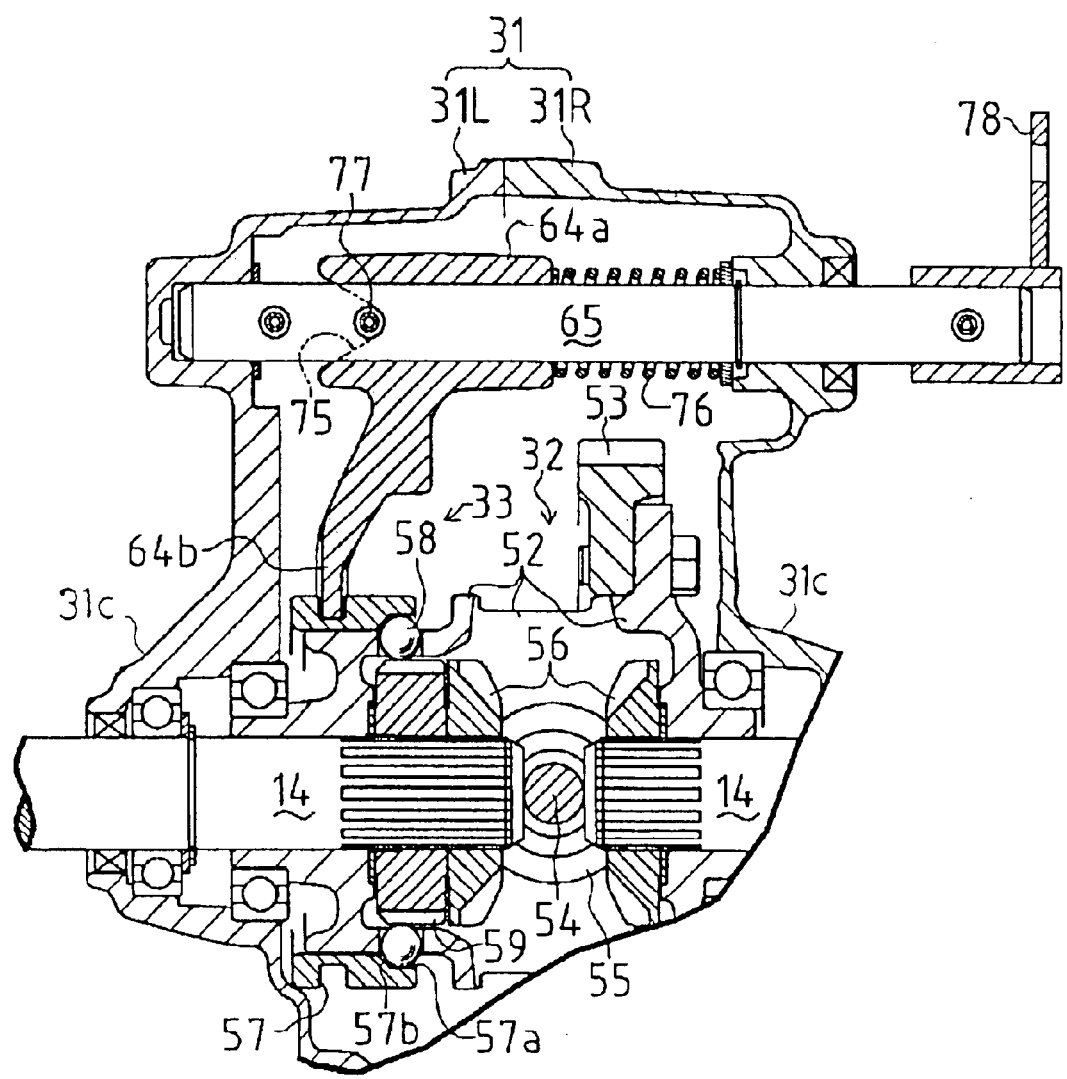
FIG. 7 is a developed sectional view of an operation system for a differential locking mechanism.

As shown in FIGS. 4, 5 and 7, fork portion 64b of differential shift member 64 is fitted into an annular groove formed on an outer peripheral surface of differential locking slider 57. As shown in FIG. 7, differential shift member 64 consists of a base portion 64a and fork portion 64b integrally extended from base portion 64a. Base portion 64a is relatively rotatably and axially slidably provided around an intermediate portion of a differential control shaft 65 rotatably laid in transmission housing 31. However, by fitting fork portion 64b to differential locking slider 57, the relative rotatability of differential shift member 64 around differential control shaft 65 is restricted.

One end edge of base portion 64a is notched in a V-like shape so as to form a cam portion 75. Pin 77 is fixed onto the intermediate portion of differential control shaft 65. A spring 76 is interposed between base portion 64a and an inner wall of transmission housing 31, so that spring 76 biases differential shift member 64 so as to fit pin 77 in V-like shaped cam portion 75.

Differential control shaft 65 is rotatably supported by transmission housing 31, and at one end thereof projects outward from transmission housing 31 so as to be fixedly provided thereon with a differential locking control lever 78 operatively connected to differential locking lever 27 beside seat 2. Consequently, by manipulating differential locking lever 27 beside seat 2, differential control lever 78 and differential control shaft 65 are rotated together so that pin 77 on differential control shaft 77 pushes cam portion 75, thereby performing a cam function so as to axially slide differential shift member 64, which is restrained in its rotation relative to differential control shaft 65.

A wet brake 22 will now be described. As shown in FIG. 4, intermediate shaft 41 is extended rightward, supported by a sidewall 98 (of right half housing part 31R) of transmission housing 31 through a bearing 66, and projects rightwardly outward from transmission housing 31. A cylindrical wall 31a is formed on a sidewall 98 of transmission housing 31 so as to project outward, centering on the projecting portion of intermediate shaft 41. A lid 67 is attached to cylindrical wall 31a so as to cover a right end surface of sidewall 98, thereby constituting a brake chamber 68. Brake chamber 68 is disposed oppositely to output gear 51 with respect to sidewall 98 (bearing 66).

As shown in FIG. 4, while CVT 7 (the projecting portion of input shaft 5 for receiving engine power through CVT 7) is disposed at the left side of housing 31, i.e., laterally oppositely to brake chamber 68 with respect to housing 31, thereby preventing CVT 7 from hindering brake 22 and its relevant parts.

Furthermore, brake chamber 68 is disposed above one of axle support portions 31c (in this embodiment, right axle support portion 31c) of housing 31. Incidentally, input pulley 36 fixed on input shaft 5 is disposed above the other (left) axle support portion 31c. Thus, the dead spaces above axle support portions 31c of housing 31 are utilized for arrangement of brake chamber 68 and input pulley 36, thereby ensuring the compactness of transmission 4.

Wet brake 22 is constructed around the projecting portion of intermediate shaft 41 in brake chamber 68. In detail, the projecting portion of intermediate shaft 41 in brake chamber 68 is splined so as to be not-relatively rotatably provided thereon with a first group of friction disks 71. A second group of friction disks 72 are not-relatively fitted into a recess 69 formed on an inner peripheral surface of cylindrical wall 31a so that each friction disk 71 and each friction disk 72 are arranged alternately.

A circular guide projection 67a is formed on an inner surface of lid 67. A ring-like shaped press member 70 is slidably provided around guide projection 67a in a state where an inner peripheral surface of press member 70 slidably contacts an outer peripheral surface of guide projection 67a. Lid 67 is formed at the inner surface thereof with semicircular recesses around guide projection 67a. On the other hand, recesses, which are substantially half-conic (triangular when viewed in side), are formed on a surface of press member 70 facing the inner surface of lid 67 so as to correspond to the respective semicircular recesses of lid 67. A steel ball 73 is sandwiched between each recess of lid 67 and each recess of press member 70 so as to perform a cam function. Press member 70 abuts at the opposite surface thereof against a ring member 74 so as to be allowed to press friction disks 71 and 72 through ring member 74.

As shown in FIG. 6, a brake control shaft 79 is rotatably supported parallel to intermediate shaft 41 in one side area of brake chamber 68. Brake control shaft 79 is fitted at one end thereof into a boss portion 31b formed on an outer surface of the sidewall of transmission housing 31, and projects at the other end thereof outward through lid 67 so as to be fixedly provided thereon with a brake control arm 80 operatively connected to a later-discussed brake pedal 23 (see FIG. 11) through an optimal linkage. Brake control shaft 79 is cut away at an intermediate portion thereof into a sectionally semicircular shape serving as a cam portion.

By depressing brake pedal 23, brake control arm 80 and brake control shaft 79 are rotated together so that the cam portion of brake control shaft 79 pushes and rotates press member 70. Steel balls 73 function as a cam so as to generate a thrusting force in press member 70 according to the rotational variation of press member 70, thereby pressing all friction disks 71 and 72 so as to frictionally brake intermediate shaft 41 and apply a braking function to drive wheels 8 through differential gear unit 32 and yoke shafts 14.

For constituting wet brake 22, oil is fed into brake chamber 68 as follows. An appropriate quantity of lube oil is filled in transmission housing 31. Differential gear unit 32 with yoke shafts 14, etc. are submerged in the lube oil so as to be lubricated naturally. As shown in FIGS. 5 and 8, a plurality of openings 99a, 99b, 99c, 99d and 99e are formed in the ceiling of transmission housing 31. As shown in FIG. 5, an oil gauge cap 91 is plugged into one of the openings (opening 99a). The top of an oil gauge rod 85 is fixed to a bottom surface of oil gauge cap 91 so as to measure the amount of lube oil in transmission housing 31. Oil gauge rod 85 sinks a little below predetermined lube oil level OL when oil gauge cap 91 screwed into opening 99a is properly located. For investigating whether the amount of lube oil is sufficient, oil gauge cap 91 is removed and oil gauge rod 85 is pulled out so that the area of a gauge surface 85a wet by lube oil at the lower end of oil gauge rod 85 is measured. Incidentally, opening 99e shown in FIG. 8 is provided for fixation of a breather cap 88 (see FIG. 3) serving as an air port through transmission housing 31.

Oil level OL is set to be as high as gauge surface 85a of oil gauge rod 85 shown in FIG. 5. When a proper quantity of lube oil is poured in transmission housing 31, differential casing 52 of differential gear unit 32 is almost entirely submerged in the lube oil while a portion of ring gear 53 on differential casing 52 projects upward from the lube oil surface. Accordingly, intermediate shaft 41 disposed above ring gear 53 is not submerged in the lube oil, whereby natural lubrication of intermediate shaft 41 with the lube oil is not performed.

A guide wall 89 is integrally extended in the longitudinal direction of the vehicle from the inner wall of transmission housing 31 so as to divide a rear half of the inner space of transmission housing 31 into upper and lower parts. As shown in FIG. 8, by joining right and left half housing parts 31R and 31L to each other so as to constitute transmission housing 31, a portion 89R, formed on an inner sidewall surface of right half housing part 31R, and a portion 89L, formed on an inner sidewall surface of left half housing part 31L, are joined to each other so as to form guide wall 89. An outline of guide wall 89 when viewed from the side is shaped substantially along the outer periphery of ring gear 53 of differential gear unit 32. A terminal end of guide wall 89 is disposed substantially above intermediate shaft 41.

Due to this structure, when vehicle 1 travels forward, the lube oil is splashed up by rotation (along the bold arrow of FIG. 5) of ring gear 53 of differential gear unit 32. The bottom surface of guide wall 89 restrains dispersion of the splashed oil and guides the oil forward (along the outlined arrow of FIG. 5), thereby ensuring efficient lubrication of output gear 51, etc. on intermediate shaft 41 above ring gear 53 even if the lube oil surface is lower than predetermined oil level OL.

As shown in FIGS. 5 and 8, an oil-leading hole 92 is formed in sidewall 98 of guide wall 89 just below guide wall 89 so as to bring the interior space of transmission housing 31 into fluid communication with brake chamber 68. Accordingly, the oil splashed by rotating ring gear 53 and restrained by the bottom surface of guide wall 89 is guided forward following the outlined arrow of FIG. 5, and partly introduced into brake chamber 68 through oil-leading hole 92 in sidewall 98. Hence, brake 22 is so constructed as to be a wet type brake, which is advantageous in durability and reliability.

Furthermore, oil-returning holes 93 and 94 are bored through sidewall 98 of right half housing part 31R below oil-leading hole 92 so as to return the lube oil from brake chamber 68 into the lube oil sump in transmission housing 31. In addition, a plurality of openings 95 and 96 are bored through sidewall 98 of right half housing part 31R so as to let air flow between the interior of transmission housing 31 and brake chamber 68, thereby promoting circulation of lube oil.

Figure 9:
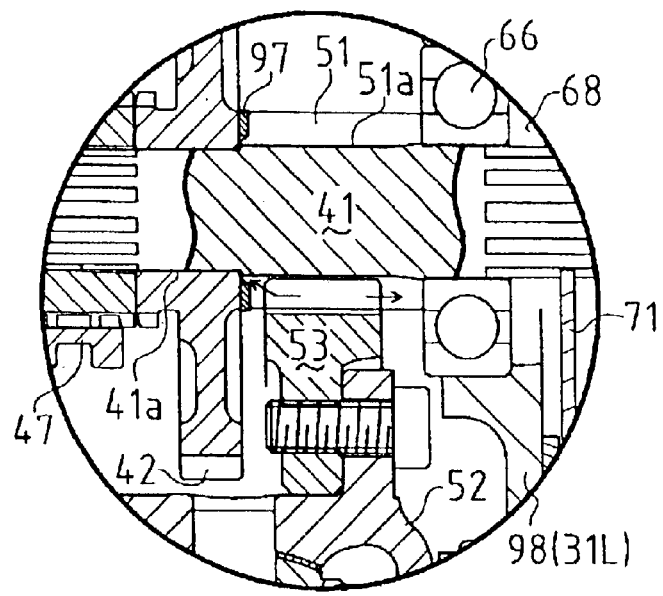
FIG. 9 is an enlarged sectional view of a structure for lubricating a surface of an intermediate shaft for supporting a forward-traveling driven gear.
Figure 10:
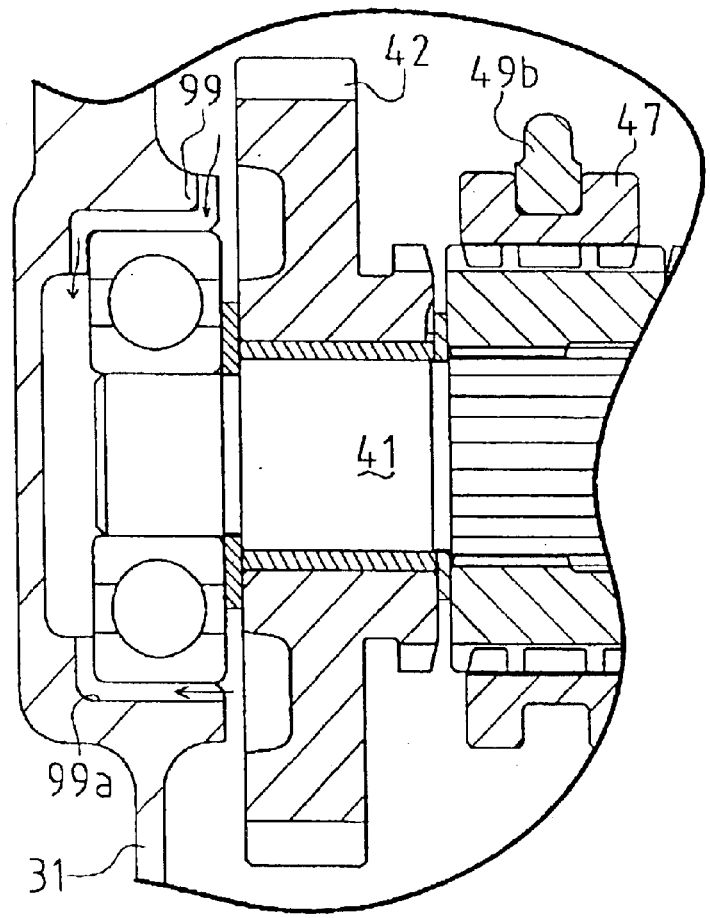
FIG. 10 is an enlarged sectional view of a bearing portion of the transmission housing for journaling the intermediate shaft, showing oil flowing into a groove formed in the bearing portion.

Referring now to FIG. 9, a washer 97 is fitted to an end of output gear 51 formed on intermediate shaft 41 adjacent to forward-traveling driven gear 42 and opposite to brake chamber 68. At this end of output gear 51, teeth of output gear 51 are notched at apex edges thereof so as to form a substantially annular recess into which washer 97 is fitted. While ring gear 53 is meshed with output gear 51 and rotated (e.g., along the bold arrow of FIG. 5), lube oil remains in gaps among the teeth of ring gear 53 on intermediate shaft 41. Finally, the lube oil among the teeth of ring gear 53 enters gaps among the teeth of output gear 51 while being pushed out along an axis of intermediate shaft 41 by ring gear 53 along the arrow of FIG. 9. A peripheral surface of intermediate shaft 14 in each gap between adjacent teeth of output gear 51, i.e., a gap bottom 51a forms a gap with an inner peripheral surface of washer 97 at the end of output gear 51. The lube oil among the teeth of output gear 51 flows through each gap between gap bottom 51a and the inner peripheral surface of washer 97 into a gap between forward-traveling driven gear 42 and an outer peripheral surface 41a of intermediate shaft 41, thereby lubricating and cooling gear 42 and shaft 41.

As shown in FIG. 8, for supporting shafts such as input shaft 5 and intermediate shaft 41, bosses 99 are formed on right and left sidewalls of transmission housing 31 so as to fit respective bearings therein. Each boss 99 is partly notched at an inner peripheral surface thereof, to which an outer ring of each bearing is fitted, so as to form a groove 99a. Groove 99a allows lube oil to flow therethrough, following the arrow of FIG. 10, for example, so as to contribute to the lubrication of the shafts supported in transmission housing 31 and the gears disposed on the shafts.

As shown in FIG. 5, regarding openings 99b, 99c and 99d at the ceiling of transmission housing 31, while opening 99d is provided to rotatably and slidably support shift control shaft 60 therethrough as mentioned above, openings 99b and 99c are provided for attachment of an oiling cap 86 and governor shaft 84, respectively. Openings 99b and 99c are equal to each other in inner diameters thereof, and disposed front and rear symmetrically to each other with respect to a vertical plane including the axis of input shaft 5. Thus, governor shaft 84 and oiling cap 86 are allowed to exchange there positions between openings 99b and 99c. In other words, governor shaft 84 may be selectively disposed through either opening 99b or 99c, thereby enhancing the freedom of layout. If governor shaft 84, which is disposed through opening 99c according to the illustrated embodiment, is supported through opening 99b, governor fork 83 would be reversed in the longitudinal direction of the vehicle so as to fit lifter 82 of governor 25. Incidentally, governor shaft 84, even if it is thin, can be supported through a cylindrical supporter 87 in opening 99c.

An interlocking connection of differential locking mechanism 33 and brake 22 in transmission 4 will now be described in accordance with FIG. 11.

Brake pedal 23 is pivoted at a top cylindrical base portion 23a thereof in a suitable position of the vehicle 1, and a bottom portion of brake pedal 23 serves as a surface 23b to be depressed by a driver's foot. Brake pedal 23 is biased toward its brake-relief position by a spring 43. Brake pedal 23 is connected at an intermediate portion thereof to an intermediate member 30, which is formed therein with a slot 30a having an optimal length. A tip of a piston rod 100a of a hydraulic cylinder 100 is fitted into slot 30a so as to be slidable along slot 30a.

If a depression stroke of brake pedal 23 is less than a stroke determined by the length of slot 30a, the tip of piston rod 100a remains in place while intermediate member 30 slides against the tip of piston rod 100a, whereby hydraulic cylinder 100 does not actuate. If brake pedal 23 is depressed to a stroke more than that determined by the length of slot 30a, intermediate member 30 pushes the tip of piston rod 100a at an end of slot 30a so as to contract piston rod 100a, thereby making hydraulic cylinder 100 discharge oil. An oil sump 101 feeds hydraulic oil to hydraulic cylinder 100.

The flow of oil discharged from hydraulic cylinder 100 is divided into two flows. One oil flow is led to a pair of disk brakes 102 for braking respective front wheels 12. The other oil flow is led into a hydraulic brake cylinder 103, whose piston rod 103a is connected to brake control arm 80 of brake 22. Accordingly, by discharging oil from hydraulic cylinder 100, both disk brakes 102 brake front wheels 12, and simultaneously, brake cylinder 103 is fed with oil to extend piston rod 103a so that brake control arm 80 of brake 22 is rotated to a "brake" position B, thereby applying a braking force onto intermediate shaft 41 so as to brake rear drive wheels 9. Consequently, all four front and rear wheels 9 and 12 are braked by depressing brake pedal 23.

An arm 37 is fixedly provided upward on base portion 23a of brake pedal 23. A link rod 24, in which a compressed spring 24a is interposed, is pivotally connected at one end thereof to a tip of arm 37. Link rod 24 is connected at the other end thereof to differential locking control lever 78 for operating differential locking mechanism 33. In detail, the end of link rod 24 is fitted into a slot 78a formed in differential locking control lever 78 so as to be slidable along slot 78a.

Differential locking control lever 78 is pivotally connected at a tip thereof to one end of another link rod 26, which is pivotally connected at the other end thereof to an arm 28 fixed onto a base portion of differential locking lever 27 disposed beside seat 2. A spring 29 biases differential locking lever 27 toward an "unlocking" position UL. By rotating differential locking lever 27 to a "locking" position L against spring 29, differential locking control lever 78 is pulled by link rod 26 so as to reach its locking position L, thereby causing differential locking mechanism 33 to integrate rear wheel axles 8 with each other.

The operation of the link system shown in FIG. 11 will be described. Initially, differential locking lever 27 is located at unlocking position UL so as to set differential locking control lever 78 at its unlocking position UL. It is supposed that brake pedal 23 is not depressed and brake control arm 80 of brake 22 is located at its "non-brake" position NB. Then, by gradually depressing pedal surface 23b of brake pedal 23, intermediate member 30 is pushed by brake pedal 23. Simultaneously, arm 37 is rotated together with brake pedal 23 so as to push differential locking control lever 78 via link rod 24. Finally, differential locking control lever 78 reaches its locking position L and remains there so as to integrate rear wheel axles 8 with each other because differential locking lever 27 rotating together with differential locking control lever 78 through link rod 26 and arm 28 comes to abut against a stopper S at locking position L of differential locking lever 27. However, in this stage, piston rod 100a of hydraulic cylinder 100 is kept in its extended condition because slot 30a of moving intermediate member 30 allows the tip of piston rod 100a therein to slide relatively to intermediate member 30. Thus, brakes 102 and 22 do not actuate for braking yet while rear wheel axles 8 are mutually integrated (differential locking mechanism 33 cancels the differential function of differential gear unit 32).

In this stage, compressed spring 24a can be further compressed so as to allow brake pedal 23 to rotate further to the limit stroke. Then, if pedal surface 23b of brake pedal 23 is further depressed, intermediate member 30 pushed by brake pedal 23 comes to abut at the end of slot 30a thereof against the tip of piston rod 100a of hydraulic cylinder 100, and pushes piston rod 100a into hydraulic cylinder 100, thereby making hydraulic cylinder 100 discharge oil. Thus, brakes 102 actuate to brake front wheels 12, and piston rod 103a is extended out from hydraulic cylinder 103 so as to rotate brake control arm 80 from non-brake position NB to brake position B, thereby braking intermediate shaft 41 and rear wheel axles 8.

Consequently, while brake pedal 23 is depressed gradually, it is ensured that braking force is applied onto real drive wheels 9 and front wheels 12 in proportion to the depression of brake pedal 23. On the other hand, at the beginning of the depression of brake pedal 23, differential locking mechanism 33 integrates rear wheel axles 8 with each other before brakes 22 and 102 begin to actuate. Even if loads applied onto right and left rear drive wheels 9 by a road surface are different from each other on braking because the road surface is rough, differential locking mechanism 33 integrates rear wheel axles 8 with each other by starting to depress brake pedal 23 before the actuating of brakes 102 and 22, thereby ensuring that vehicle 1 will stop without unexpected lateral movement.

Incidentally, brake pedal 23 is prevented from being unexpectedly rotated to brake the vehicle according to manipulation of differential locking lever 27 for differential locking. In this regard, when brake pedal 23 is not depressed, slot 78a of differential locking control lever 78 allows the end of link rod 24 to slide relatively therein. Thus, even if differential locking lever 27 is manipulated to its locking position L, differential locking control lever 78 is allowed to rotate to its locking position L while brake pedal 23 is kept at its initial (not-braking) position.

Figure 12:
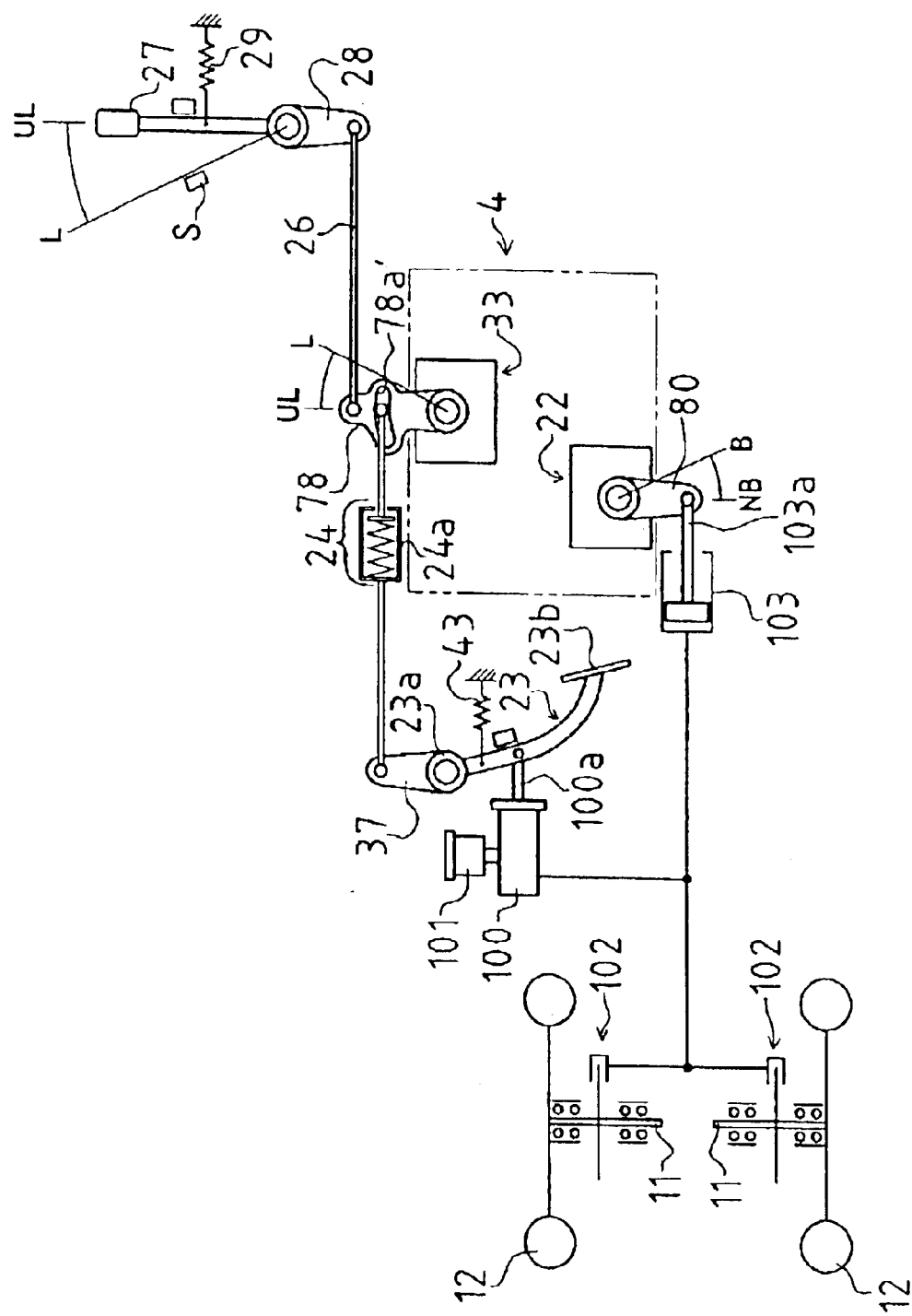
FIG. 12 is a diagram of another linkage between the brake pedal and the differential locking mechanism.

Another embodiment concerning interlocking connection of differential locking mechanism 33 and brake 22 in transmission 4 will now be described in accordance with FIG. 12.

Figure 11:
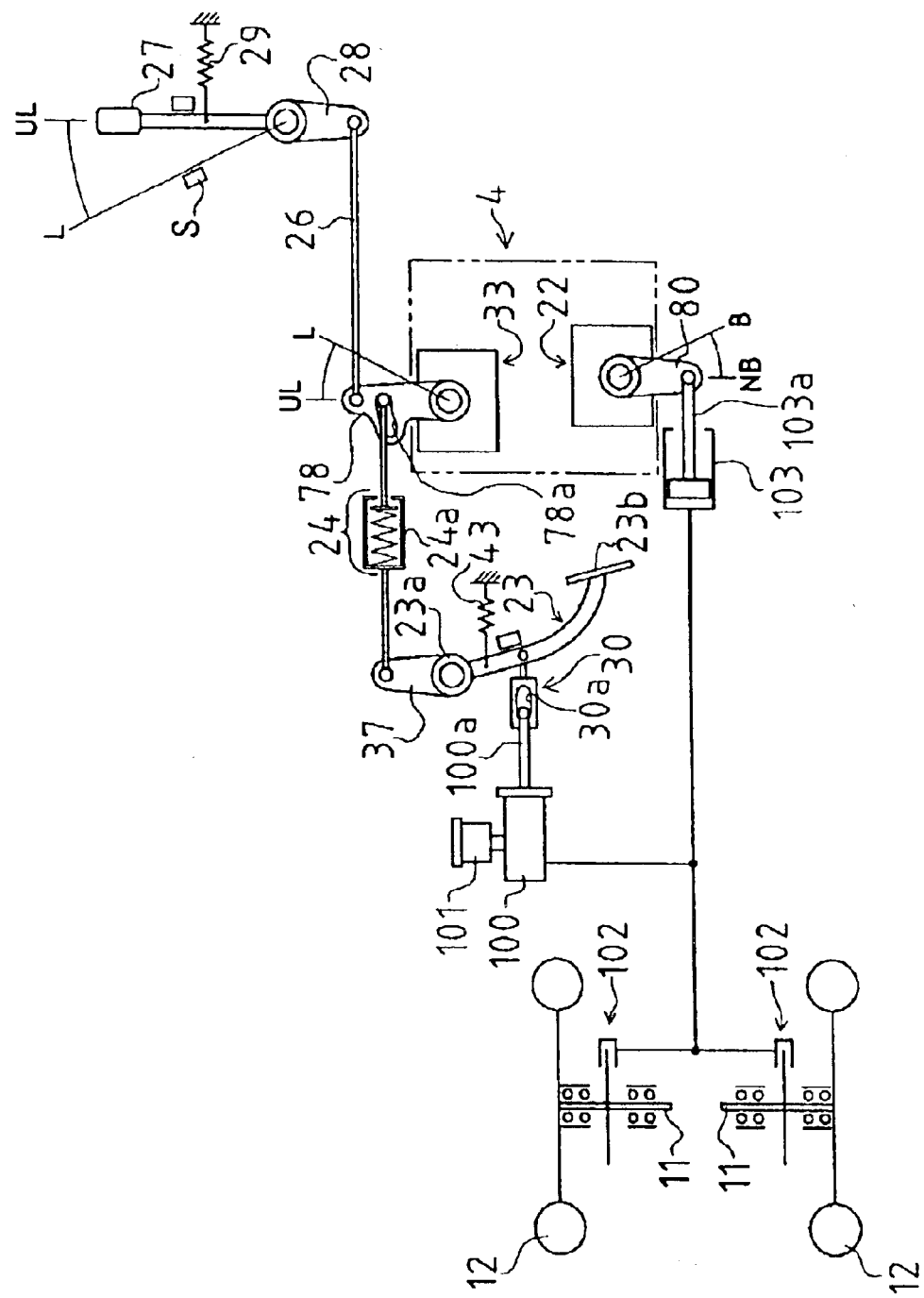
FIG. 11 is a diagram of a linkage between a brake pedal and the differential locking mechanism.

In this embodiment, piston rod 100a of hydraulic cylinder 100 is directly connected to brake pedal 23 without intermediate member 30 shown in FIG. 11. Assuming that the positions and full strokes of brake pedal 23, differential locking control lever 78 and differential locking lever 27 are equal to those of FIG. 11, a slot 78a' of differential locking control lever 78 is a little longer than slot 78a of differential locking control lever 78 of FIG. 11. There is established a certain depression stroke of brake pedal 23, where light braking force is applied onto rear drive wheels 8. Due to this structure, unless depressed brake pedal 23 reaches the pre-established stroke, the end of link rod 24 in slot 78a' does not reach the end of slot 78a', thereby keeping differential control lever 78 in place. When brake pedal 23 is depressed beyond the pre-established stroke, the end of link rod 24 in slot 78a' abuts against the end of slot 78a' and pushes differential locking control lever 78 to locking position L. The structure, which is not described, is similar to that of FIG. 11.

The operation of the link system shown in FIG. 11 will be described. Initially, differential locking lever 27 is located at unlocking position UL so as to set differential locking control lever 78 at its unlocking position UL. It is assumed that brake pedal 23 is not depressed and brake control arm 80 of brake 22 is located at its "non-brake" position NB. Then, by gradually depressing pedal surface 23b of brake pedal 23, piston rod 100a is pushed into hydraulic cylinder 100 by brake pedal 23. Simultaneously, arm 37 is rotated together with brake pedal 23 so as to push differential locking control lever 78 through link rod 24. Hydraulic cylinder 100 discharges oil so that brakes 102 actuate to brake front wheels 12, and piston rod 103a is extended out from hydraulic cylinder 103 so as to rotate brake control arm 80 from non-brake position NB to brake position B, thereby braking intermediate shaft 41 and rear wheel axles 8. However, in this stage, rear drive wheels 9 and front wheels 12 are braked softly, and the end of link rod 24 slides in slot 78a' so that differential locking control lever 78 is still held at its unlocking position UL.

Then, if brake pedal 23 is depressed further, piston rod 100a is further pushed into hydraulic cylinder 100 so as to increase oil discharged from hydraulic cylinder 100, thereby increasing braking force onto wheels 9 and 12. Simultaneously, the end of link rod 24 abuts against the end of slot 78a' and pushes differential locking control lever 78 so as to rotate levers 78 and 27 to their locking positions L determined by stopper S against which differential locking lever 27 is pressed, whereby rear wheel axles 8 are integrated with each other. After levers 78 and 27 are retained at locking positions L by stopper S, compressed spring 24a is further compressed so as to allow brake pedal 23 to rotate to the full stroke, thereby increasing the braking force so as to finally brake wheels 12 and 9.

Consequently, when the vehicle 1 is fully braked, the differential locking is performed to prevent the vehicle 1 from unexpected lateral movement. On the other hand, at the beginning of the depression of brake pedal 23, that is, before brake pedal 23 is depressed beyond the pre-established stroke, rear wheel axles 8 are allowed to rotate differentially while being braked softly, thereby giving the embodiment of FIG. 12 a characteristic effect that the vehicle 1 can be steered as a driver desires while the traveling speed of the vehicle is restrained safely. As a further effect, the life of differential locking mechanism 33 is increased because the frequency of actuation thereof is reduced.

It is further understood by those skilled in the art that the foregoing description is a preferred embodiment of the disclosed device and that various changes and modifications may be made in the invention without departing from the spirit and scope thereof.

What is claimed is:

1. A transmission of a working vehicle having a prime mover and a continuously variable transmission, comprising:

a housing, whose interior serves as a fluid sump;

an input shaft supported by the housing so as to receive power of the prime mover through the continuously variable transmission;

a reversing mechanism for changing the traveling direction of the vehicle; an intermediate shaft drivingly connected to the input shaft through the reversing mechanism;

an axle supported by the housing;

a deceleration gear train drivingly connecting the intermediate shaft to the axle, the deceleration gear train including a pinion, wherein the reversing mechanism is disposed on one end portion of the intermediate shaft, and the pinion of the deceleration gear train is disposed on the other end portion, a brake chamber formed on an outer surface of a sidewall of the housing oppositely to the pinion with respect to the sidewall, and a wet brake constructed on an end portion of the intermediate shaft in the brake chamber, wherein the end portion of the intermediate shaft projects through the sidewall of the housing into the brake chamber, and wherein the fluid in the fluid sump is splashed by a gear of the deceleration gear train so as to flow into the brake chamber through the sidewall of the housing, and is returned from the brake chamber to the fluid sump.

2. The transmission according to claim 1, further comprising:

a guide member for guiding the splashed fluid, the guide member provided on an inner surface of a sidewall of the housing, extended along an outer periphery of the deceleration gear, and having a final end substantially above the intermediate shaft.

3. The transmission according to claim 1, further comprising:

a differential gear unit; and a pair of right and left axles serving as the axle, the pair of axles being mutually differentially connected through the differential gear unit, wherein the differential function of the differential gear unit is canceled in connection with operation of the wet brake just before the brake begins to act.

4. The transmission according to claim 1, further comprising:

a differential gear unit; and a pair of right and left axles serving as the axle the pair of axles, being mutually differentially connected through the differential gear unit, wherein the differential function of the differential gear unit is canceled in connection with operation of the wet brake immediately after the brake begins to act.

5. A transmission of a working vehicle having a prime mover and a continuously variable transmission, comprising:

a housing;

a pair of axle support portions of the housing, integrally projecting laterally from respective right and left sides of the housing;

an input shaft supported by the housing so as to receive power from the prime mover through the continuously variable transmission;

a reversing mechanism for changing a traveling direction of the vehicle;

an intermediate shaft having at least two ends, the intermediate shaft drivingly connected to the input shaft through the reversing mechanism;

an axle supported by the pair of axle support portions of the housing;

a deceleration gear train drivingly connecting the intermediate shaft to the axle;

a brake chamber formed on an outer surface of an exterior sidewall of the housing above one of the axle support portions;

a wet brake constructed on one end portion of the intermediate shaft in the brake chamber, wherein the brake end portion of the intermediate shaft projects through the sidewall of the housing into the brake chamber;

a differential gear unit; and a pair of right and left axles serving as the axle, the pair of axles being mutually differentially connected through the differential gear unit, wherein the differential function of the differential gear unit is canceled in connection with operation of the wet brake just before the brake begins to act.

6. The transmission according to claim 5, further comprising:

a guide wall extended from an inner wall of said housing.

7. The transmission according to claim 6, wherein:

a terminal end of said guide wall is disposed substantially above said intermediate shaft.

8. A transmission of a working vehicle having a prime mover and a continuously variable transmission, comprising:

a housing, wherein the continuously variable transmission is disposed at one of right and left sides of the housing;

an input shaft supported by the housing so as to receive power from the prime mover through the continuously variable transmission;

a reversing mechanism for changing traveling direction of the vehicle;

an intermediate shaft having at least two ends, the intermediate shaft drivingly connected to the input shaft through the reversing mechanism;

an axle supported by the housing;

a deceleration gear train drivingly connecting the intermediate shaft to the axle;

a brake chamber formed on an outer surface of an exterior sidewall of the housing laterally oppositely to the continuously variable transmission;

a wet brake constructed on one end portion of the intermediate shaft in the brake chamber, wherein the brake end portion of the intermediate shaft projects through the sidewall of the housing into the brake chamber;

a differential gear unit; and a pair of right and left axles serving as the axle, the pair of axles being mutually differentially connected through the differential gear unit, wherein the differential function of the differential gear unit is canceled in connection with operation of the wet brake just before the brake begins to act.

9. The transmission according to claim 8, further comprising:

a guide wall extended from an inner wall of said housing.

10. The transmission according to claim 9, wherein:

a terminal end of said guide wall is disposed substantially above said intermediate shaft.

* * * * *

UNITED STATES PATENT AND TRADEMARK OFFICE
CERTIFICATE OF CORRECTION

PATENT NO.     : 6,892,595 B2
DATED          : May 17, 2005
INVENTOR(S)    : Inoue et al.

It is certified that error appears in the above-identified patent and that said Letters Patent is hereby corrected as shown below:

Column 14,
Lines 39-40, reads "a pair of right and left axles serving as the axle the pair of axles, being mutually differentially connected through" should read -- a pair of right and left axles serving as the axle, the pair of axles being mutually differentially connected through --.

Signed and Sealed this

Twentieth Day of September, 2005

JON W. DUDAS
*Director of the United States Patent and Trademark Office*